(12) United States Patent
Grant

(10) Patent No.: US 12,173,749 B2
(45) Date of Patent: Dec. 24, 2024

(54) POLE JOINT

(71) Applicant: Hubbell Incorporated (Delaware), Fenton, MO (US)

(72) Inventor: Andrew J. Grant, Hempstead, TX (US)

(73) Assignee: HUBBELL INCORPORATED (DELAWARE), Fenton, MO (US)

( * ) Notice: Subject to any disclaimer, the term of this patent is extended or adjusted under 35 U.S.C. 154(b) by 298 days.

(21) Appl. No.: 17/802,902

(22) PCT Filed: Feb. 5, 2021

(86) PCT No.: PCT/US2021/016904
§ 371 (c)(1),
(2) Date: Aug. 26, 2022

(87) PCT Pub. No.: WO2021/173327
PCT Pub. Date: Sep. 2, 2021

(65) Prior Publication Data
US 2023/0102551 A1  Mar. 30, 2023

Related U.S. Application Data

(60) Provisional application No. 62/982,062, filed on Feb. 26, 2020.

(51) Int. Cl.
*F16C 11/04* (2006.01)
*F16B 7/04* (2006.01)
*F16L 27/08* (2006.01)

(52) U.S. Cl.
CPC ............ *F16C 11/045* (2013.01); *F16B 7/042* (2013.01); *F16L 27/08* (2013.01)

(58) Field of Classification Search
None
See application file for complete search history.

(56) References Cited

U.S. PATENT DOCUMENTS 4,329,078 A * 5/1982 Crates ............... F16B 7/042
403/329
5,195,551 A  3/1993 Ju
(Continued)

FOREIGN PATENT DOCUMENTS

EP         2105619 A2 *  9/2009  ............ F16B 21/04
KR      101497661 B1     3/2015
WO   WO-2014194367 A1 * 12/2014  ......... E04H 12/187

OTHER PUBLICATIONS

International Preliminary Report on Patentability in corresponding International Application No. PCT/US2021/016904 mailed Aug. 30, 2022. (5 pages).

(Continued)

*Primary Examiner* — Joshua K Ihezie
(74) *Attorney, Agent, or Firm* — Wissing Miller LLP

(57) ABSTRACT

Methods, systems, devices, and products for use in a pole support system. Apparatus include a hinge joint comprising: a base having an insertion end with a longitudinal slot and with a fulcrum protrusion on an inner surface; a cup having a receiving end selectively receiving the insertion end of the base; a securing assembly configured to selectively release the cup from the base, the securing assembly comprising a rotatable shaft that translates along the longitudinal slot between at least i) a lower relative position corresponding to an engaged state in which the insertion end is received by the receiving end, and ii) an upper relative position corresponding to a released state in which the insertion end is free of the receiving end; the shaft having a cam projection positioned to contact against the fulcrum protrusion and displace the shaft toward the upper relative position when the shaft is rotated.

14 Claims, 14 Drawing Sheets

(56) References Cited

U.S. PATENT DOCUMENTS

| | | | | |
|---|---|---|---|---|
| 5,782,042 | A * | 7/1998 | Klein | E04H 12/187 |
| | | | | 52/120 |
| 8,863,450 | B2 * | 10/2014 | Anderson | E04H 12/345 |
| | | | | 52/165 |
| 8,910,431 | B2 * | 12/2014 | Egan | E02D 27/42 |
| | | | | 52/116 |
| 10,598,359 | B2 * | 3/2020 | Pannekoek | E04H 12/187 |
| 2014/0115977 | A1 | 5/2014 | Egan et al. | |
| 2015/0167345 | A1 * | 6/2015 | Sosnowski | E04H 15/48 |
| | | | | 403/4 |
| 2018/0195309 | A1 * | 7/2018 | Sosnowski | E04H 15/48 |
| 2018/0231224 | A1 * | 8/2018 | Pannekoek | F21S 8/088 |
| 2019/0390695 | A1 * | 12/2019 | Sosnowski | E04H 15/48 |
| 2021/0045372 | A1 * | 2/2021 | Gravely | A01K 87/04 |
| 2021/0262504 | A1 * | 8/2021 | Sosnowski | A45B 25/00 |
| 2023/0204056 | A1 * | 6/2023 | Sosnowski | E04H 15/48 |
| | | | | 403/102 |

OTHER PUBLICATIONS

Office Action in corresponding Canadian Application No. 3,169,328 mailed Dec. 5, 2023. (3 pages).

Int'l. Search Report issued in PCT/US2021/016904 dtd Jun. 1, 2021.

* cited by examiner

POLE JOINT

CROSS-REFERENCE TO RELATED APPLICATIONS

This application is a 371 of PCT/US2021/016904 filed on Feb. 5, 2021, published on Sep. 2, 2021 under publication number WO 2021/173327, which claims priority benefits from U.S. Patent Application No. 62/982,062, filed Feb. 26, 2020 all of which are incorporated herein in their entirety by reference.

FIELD OF THE DISCLOSURE

In one aspect, this disclosure relates generally to joints for industrial support poles.

BACKGROUND OF THE DISCLOSURE

Industrial settings often feature pole-mounted equipment, such as, for example, lights. It may be necessary to perform maintenance on this equipment periodically. The dangers inherent in climbing a ladder in an industrial setting are well-known. Rotating pivot joints have been developed which enable lowering an upper portion of the pole. These pivot joints connect upper and lower pole sections. One example rotates the top end of the pole to a level closer to the pole base.

The system including the pivot joint and the coupled upper and lower sections of the pole may be called a pivoting pole assembly, swiveling pole assembly, etc. Some known systems also have a passage interior to the pole extending from the base end, through the joint, to the remote end, and wiring (wires, cables, etc.) running through the passage to the mounted equipment to provide power, communications, and so on.

SUMMARY OF THE DISCLOSURE

In aspects, the present disclosure is related to methods, systems, and apparatus for use in a pole support system comprising a plurality of pole sections. In aspects, these methods, systems, and apparatus for use in a pole support system may reduce or remove the need for the use of a ladder in performing maintenance. A first pole section of the plurality may support a second pole section of the plurality. Apparatus in accordance with embodiments of the present disclosure include a hinge joint comprising: a base having an insertion end and an adaptor end opposite the insertion end, the base having a longitudinal slot at the insertion end and comprising a tubular body with a fulcrum protrusion on an inner surface of the tubular body; a cup having a receiving end selectively receiving the insertion end of the base and an adaptor end opposite the receiving end; a securing assembly configured to selectively release the cup from the base, the securing assembly comprising a rotatable shaft that translates along the longitudinal slot between at least i) a lower relative position corresponding to an engaged state in which the insertion end of the base is received by the receiving end of the cup, and ii) an upper relative position corresponding to a released state in which the insertion end of the base is free of the receiving end of the cup; the shaft having a cam projection positioned to contact against the fulcrum protrusion and displace the shaft toward the upper relative position when the shaft is rotated.

The fulcrum protrusion may comprise a cam rest configured to receive the cam projection wherein, upon rotation of the shaft sufficient to displace the shaft a predetermined distance, a catch on the cam projection engages the rest in the released state to lock the securing assembly, and whereby the cam rest prevents movement of the rotatable shaft toward the adaptor end of the base. A bolt head may be disposed on the shaft exterior to the hinge joint, wherein the shaft is configured for rotation responsive to rotation of the bolt head. The cup may be configured to rotate about the shaft while the shaft is in the upper relative position to lower the adaptor end of the cup corresponding to an open condition of the hinge. The cup may be configured to rotate between a first angle corresponding to the engaged state and a second angle corresponding to an open state of the hinge joint. The engagement end of the base may comprise a stop constraining rotation of the cup past a critical point. The longitudinal slot may be configured to allow translating the shaft above the upper relative position to disengage the catch from the cam rest.

Apparatus in accordance with embodiments of the present disclosure may include a pole joint comprising: a tubular body including: a lower adaptor end comprising a lower coupling defining a first port configured to receive the first pole section of the plurality of pole sections; an upper adaptor end opposite the lower adaptor end, the upper adaptor end comprising an upper coupling defining a second port configured to receive the second pole section of the plurality of pole sections; and a passage between the first port and the second port allowing wiring to pass through the tubular body; and an oriel comprising a plurality of walls protruding from the tubular body, the plurality of walls and the tubular body cooperating to define a wiring chamber, the oriel having an opening allowing lateral entry to the wiring chamber. The tubular body may be configured, upon installation of the pole support system, to transfer loading between the first pole section and the second pole section.

Examples of some features of the disclosure may be summarized rather broadly herein in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

Aspects of the present disclosure relate to pole support systems and devices for incorporation within a pole support system. The pole support system may be configured for use with traditional light fixtures or various other types of mounted equipment. It would be desirable to maintain protection for wiring in light poles in industrial settings while still facilitating repair or maintenance of light fixtures atop the light pole by bringing the fixture to ground level. It would also be desirable to enable a single worker to perform the action of raising and/or lowering the fixture, thereby reducing the costs of labor relating to maintenance.

Figures 1A, 1B:
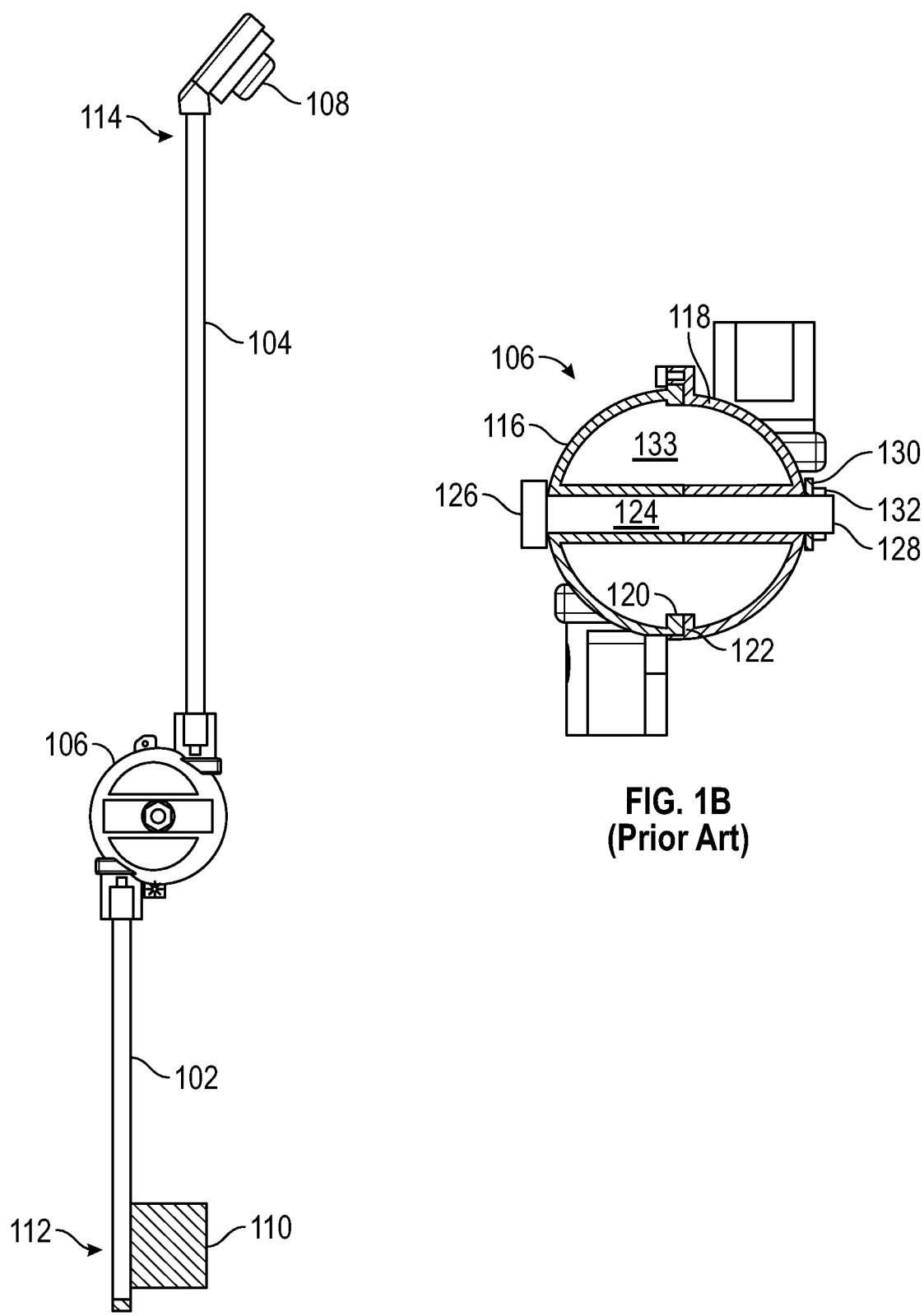
FIGS. 1A and 1B illustrate perspective views of a particular prior art rotational pole and pivot joint, respectively.

Jointed pole assemblies are known in the art. FIGS. 1A and 1B illustrate perspective views of a particular prior art rotational pole and pivot joint, respectively. Referring to FIG. 1A, the prior art rotational pole includes a lower conduit 102, an upper conduit 104, a pivot joint 106, a light fixture 108, and a junction box 110. The pole may be mounted to a rail or attached to a base (not shown). Electrical wiring (not shown) runs within conduits 102, 104 from the base end of the pole 112 through pivot joint 106 to the remote end 114 and is connected to light fixture 108. Upper conduit 104 is pivoted down for maintenance.

Referring to FIG. 1B, the prior art pivot joint 106 includes a lower cup 116 and an upper cup 118. Together, the lower cup 116 and upper cup 118 define a substantially spherical wiring chamber. The circular edges of the cups end in flanges 120, 122 that meet in sliding rotational contact defining a swivel plane. The flanges 120, 122 may include a lip so that one cup is partially nested in the other. The cups 116, 118 are held together by a central locking bolt 124, which passes approximately through the diameter of the spherical wiring chamber 133 formed by the cups. The bolt 124 includes a head 126 retained in a recess of the lower cup 116 and a threaded end 128 (opposite the head) protruding through the upper cup 118, and held in place by a washer 130 and a nut 132 providing a compressive force against the outside of upper cup 118. An indexing pin can be inserted through aligned holes formed in the lower and upper cup flanges to temporarily lock the cups with respect to each other.

Example embodiments were chosen and described in order to best explain the principles of the invention and their practical application, and to enable others of ordinary skill in the art to understand the invention for various embodiments with various modifications as are suited to the particular use contemplated. Those skilled in the art will understand, however, that the invention may be embodied as many other devices, systems, and methods. For example, various aspects of the methods and devices may be combined in various ways or with various products, including existing products. Many modifications and variations will be apparent to those of ordinary skill in the art. The scope of the invention is not intended to be limited by the details of example embodiments described herein. The scope of the invention should be determined through study of the appended claims.

Specific design details have been provided for illustration, but should not be considered limiting. Readers of skill in the art will recognize that many variations of pole joints may be implemented consistent with the scope of the invention as described by the appended claims.

Figure 2A:
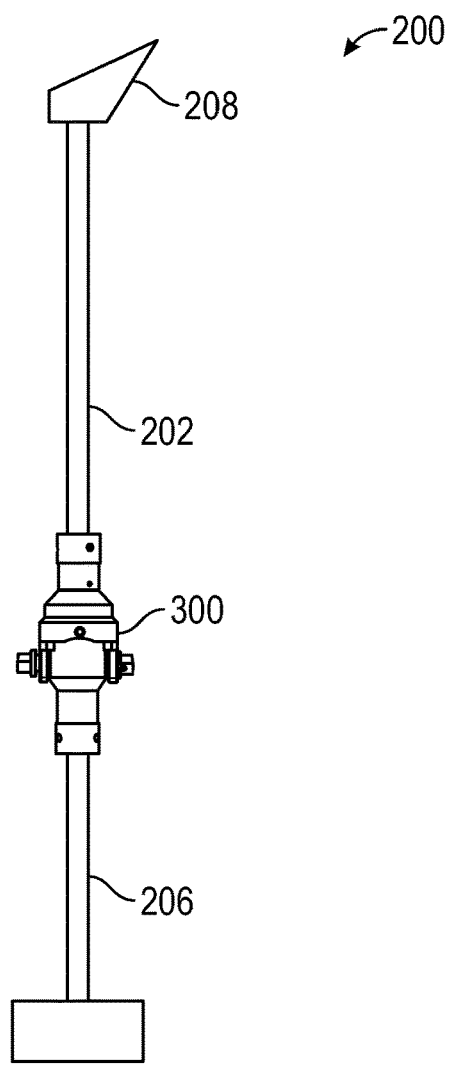
FIGS. 2A & 2B illustrate a pole support system for industrial lighting in accordance with embodiments of the present disclosure.
Figure 2B:
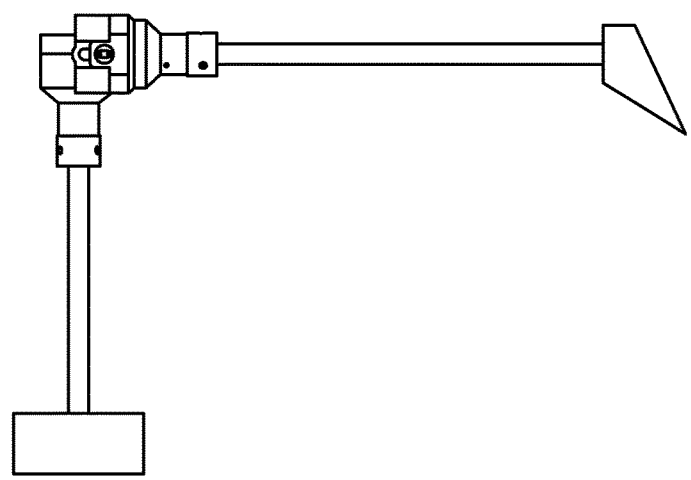

FIGS. 2A & 2B illustrate a pole support system for industrial lighting in accordance with embodiments of the present disclosure. The pole support system in FIGS. 2A & 2B contain identical components, but FIG. 2A shows the pole support system in the upright state and FIG. 2B shows the pole support system in the folded state. The pole support system 200 comprises a lower support 206, an upper support 202, and a hinge joint 300. The upper support 202 and/or the lower support 206 may be tubular. Tubular as used herein may include tubular with cylindrical, rectangular, elliptical, or irregular cross-sections. The lower and upper supports may comprise pole sections, e.g., segments of pipe from 1-5 inches in outer diameter. For example, upper support 202 and lower support 206 may be implemented as 2-inch tubular comprising aluminum, galvanized or stainless steel, other alloys, composites, or the like, or any other material as would occur to one of skill in the art, depending on the application. The pole support system supports at least one light fixture 208. The pole support system is a structural system. The hinge joint 300 is configured, upon assembly and installation of the components to form the pole support system 200, to transfer loading between the upper support and the lower support via transmission of the load through the hinge 300. The hinge joint may be configured to support all loads resulting from the upper support and components supported by the upper support ('upper support structure'), referred to herein as "supported loads". The supported loads may include live loads, sometimes also referred to as probabilistic loads, which include all the forces that are variable within the upper support structure's normal operation cycle, as well as construction and environmental loads. These live loads may be produced during maintenance by workers, equipment and materials, movement of the upper structure, and during the life of the pole support system by people, wind, rain, snow, ice, and so on.

FIGS. 3A-3F illustrate a hinge joint in accordance with embodiments of the present disclosure. Hinge joint 300 includes a base 306 configured for coupling to lower support 206 and a cup 302 configured for coupling to upper support 202. The base 306 and the cup 302 are hingedly coupled to one another by a securing assembly 304. The base 306 and cup 302 may move translationally with respect to one another along the longitudinal axis of the hinge joint 300. This translational motion facilitates reorienting the components in order to effect a change between engaged and released states for the hinge joint 300.

Figure 3B:
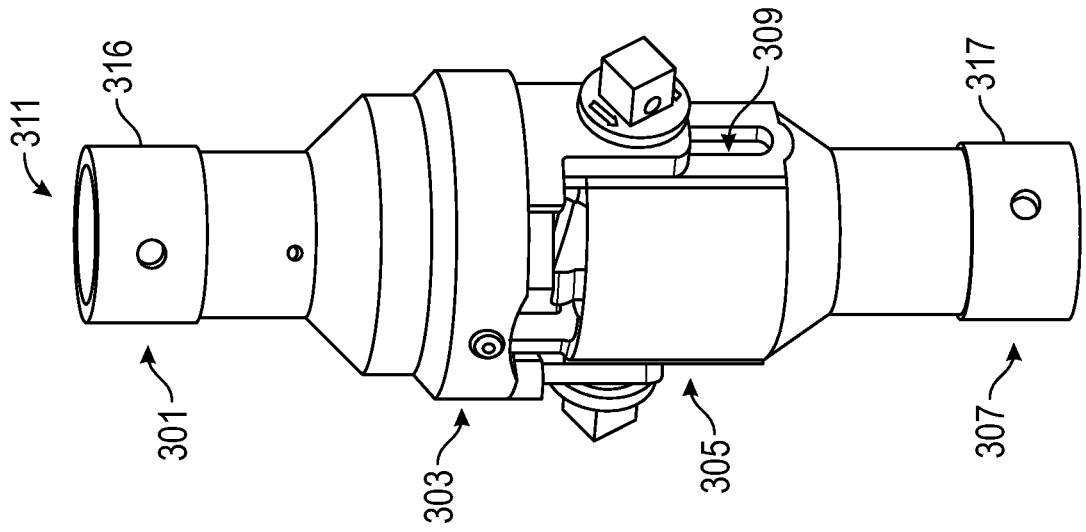
FIGS. 3A-3F illustrate a hinge joint in accordance with embodiments of the present disclosure.
Figure 3A:
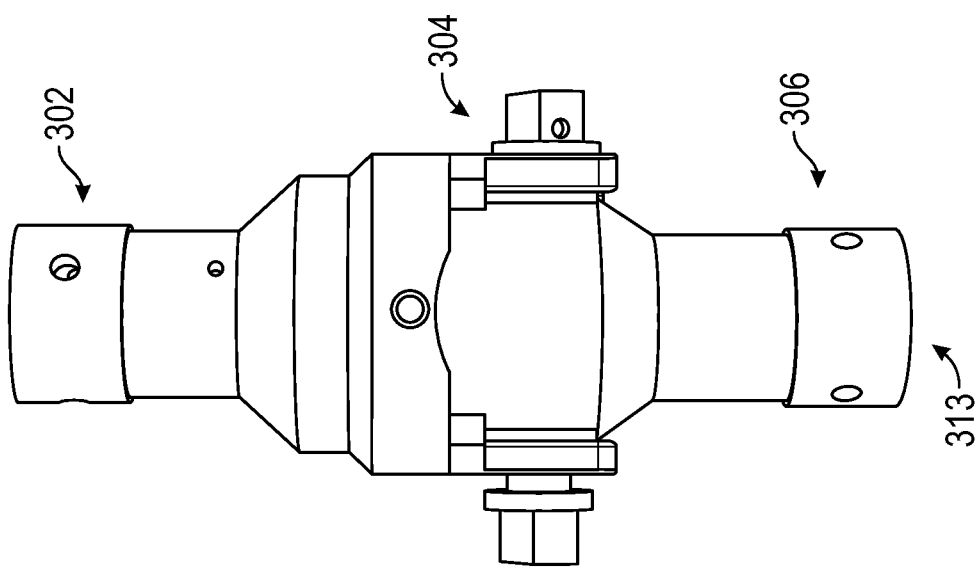

The hinge joint in FIGS. 3A & 3B contain identical components, but FIG. 3A shows the hinge joint in an engaged state and FIG. 3B shows the hinge joint in the released state. The base 306 and cup 302 each comprise a tubular body. The cup 302 has a receiving end 303 and an adaptor end 301 opposite the receiving end. The base 306 has an insertion end 305 and an adaptor end 307 opposite the insertion end 305. The receiving end 303 of cup 302 and the insertion end 305 of the base 306 feature openings, which are exposed when the hinge joint is in the released state. The receiving end 303 includes a pair of ears 310 extending axially from the opening. The base 306 has a longitudinal slot 309 at the insertion end 305. The adaptor ends 301, 307 each include a coupling 316, 317 for receiving an end of a pole section. The couplings 316, 317 each include an open end 311, 313.

Couplings 316, 317 may include mating surfaces adapted for connection with several object types or sizes, such as, for example, poles of various shapes and diameters. The mating surface may be implemented as cylindrical or square tubular bodies made from aluminum, stainless steel, galvanized steel, or other durable material. Couplings 316, 317 include port(s) for at least one fastener, such as, for example, screws, pins, bolts, and the like. In other implementations, the fastener may be incorporated into the couplings.

Figure 3C:
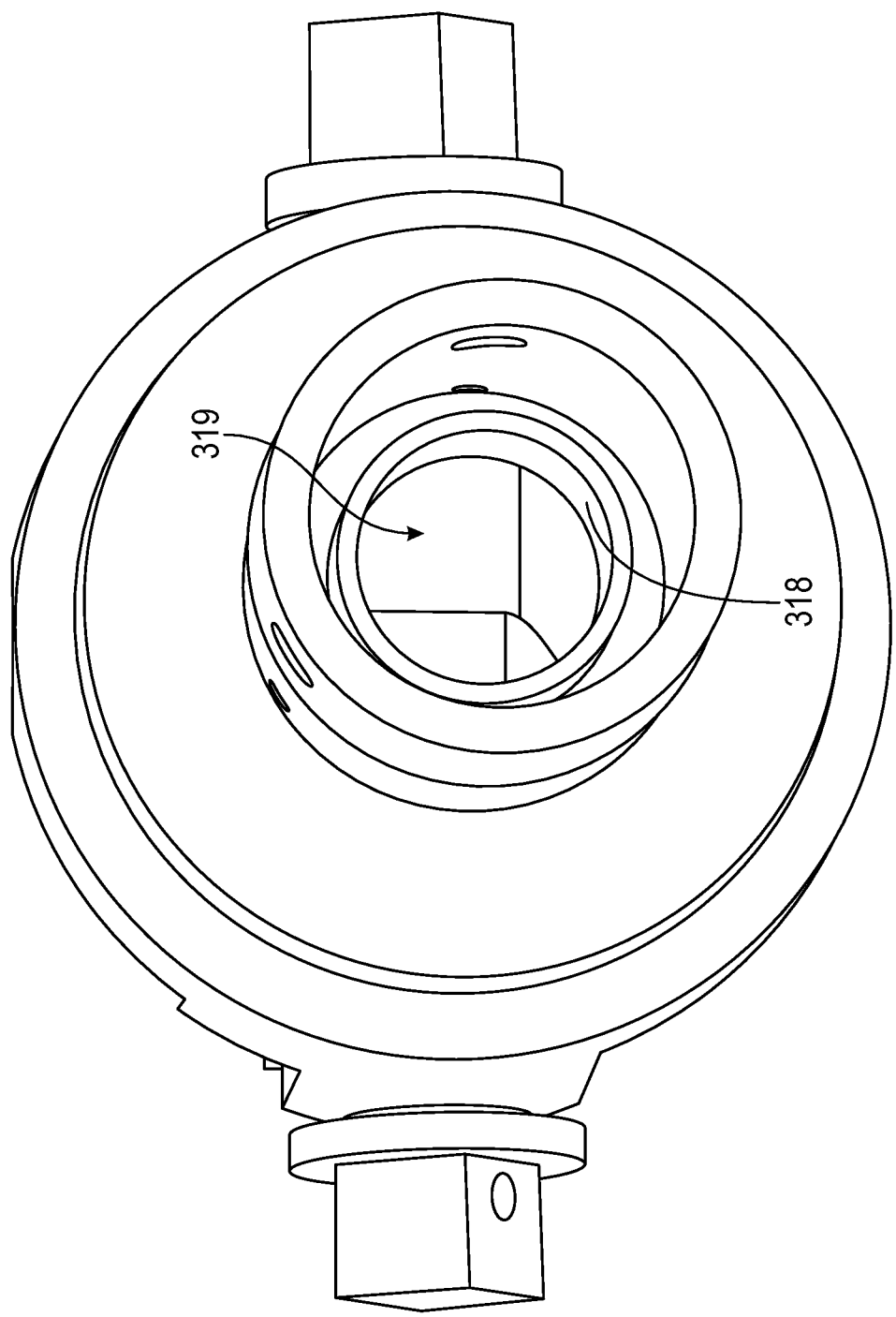

Referring to FIG. 3C, the adaptor ends 301, 307 also each include a pipe seat 318. The pipe seat 318 (respective to each adaptor end) defines a passage 319 communicating with the interior of the respective tubular body.

Hinge joint 300 is environmentally robust in that it includes features that, upon completion of assembly, protect the wiring residing interior to the assembly. Couplings 316, 317 may be configured to slide an exterior surface of a corresponding pole section along an interior mating surface, or the pole section may fit loosely in the annulus between an interior surface of the coupling and the pipe seat. When coupled, the received end of the pole section is overlapped by the pipe seat and the coupling to provide a water resistant (e.g., fluid tight) connection between adaptor end and the pole section. In some embodiments, this overlap may have sufficient dimension in the longitudinal direction to prohibit water from spilling over into the interior of the wiring tube where it may contact the wiring. In other embodiments, the adaptor end may employ a threaded connection or include other fasteners. Fasteners could also be implemented as any combination of latches, clamps, biasing members, elastomeric membranes, ratchets, or friction fit members.

In normal operation, with the support system at full height, the hinge joint 300 may be place in an engaged state (FIG. 3A) in which the insertion end of the base is received by the receiving end of the cup. In the engaged state, the joint is securely locked by the cooperation between the cup and the base, and the opening at the insertion end of the base is sheltered by the cup. Thus, the hinge joint is closed. This may be a fluid tight configuration. Further, the hinge joint 300 is configured, upon installation of the joint to form the pole support system 200, to transfer loading between the upper support and the lower support via transmission of the load from the cup 302 to the base 306. The cup and base may be co-axial and oriented in a direction substantially parallel with the gravitational force of the earth. The load from the upper support urges the cup in the direction of the base, and biases the cup to the engaged state. Thus, the load of the upper support maintains the security of the joint so that the upper support remains upright. This feature of the present disclosure provides a distinct advantage over prior art pole hinges, because the load of the upper support is advantageously employed towards locking the joint. That is, the gravity induced load on the upper pole section biases the cup and the base into a secure connection. Because the components are vertically oriented, this gravity induced load acts on a vertical line between the cup and base. Further, the gravity induced load on the upper pole section biases the joint into the lower pole section and biases the upper pole section into the joint with a load along a longitudinal axis of each of the lower pole section, the upper pole section, and the hinge.

Despite the security of the coupling while the hinge joint is in the engaged state, hinge joint 300 allows the upper support 202 to be selectively lowered when desired by releasing the cup from the base. In this open state, the cup 302 may be rotated about an axis of rotation at the hinge joint, thereby reorienting the cup 302 with respect to the base 306 and likewise changing the angle of the upper support with respect to the lower support. With sufficient rotation, the cup makes contact with the base at the desired (configured) angle, which prevents further rotation (see FIG. 3F).

The cup is placed in a released state via translational motion away from the base, so that it may "slide out." In the released state, the cup and base are still coupled, and thus the upper support 202 remains hingedly connected. Aspects of the present disclosure incorporated in some embodiments enable a single technician to lower the upper support without assistance.

Figure 3D:
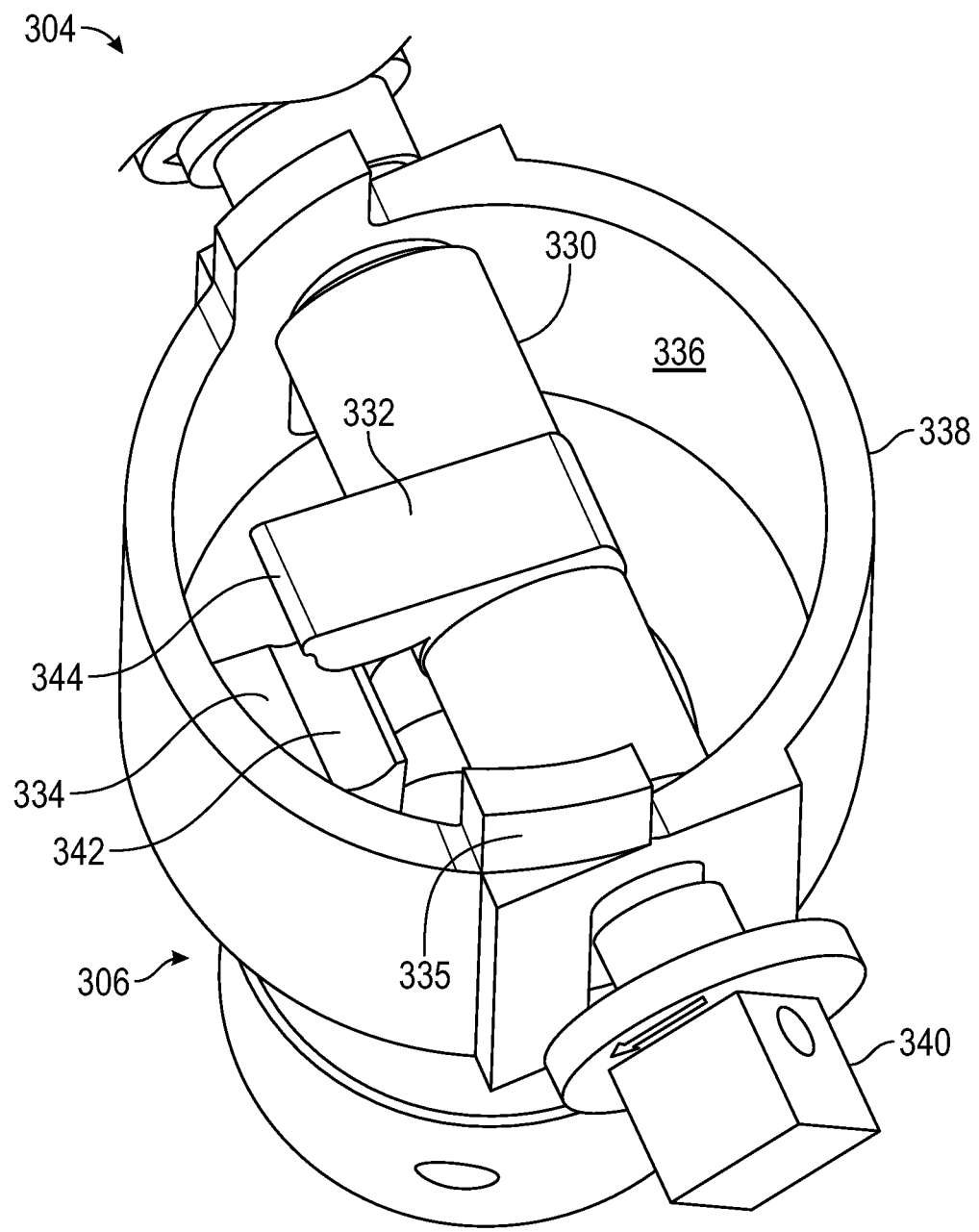
Figure 3E:
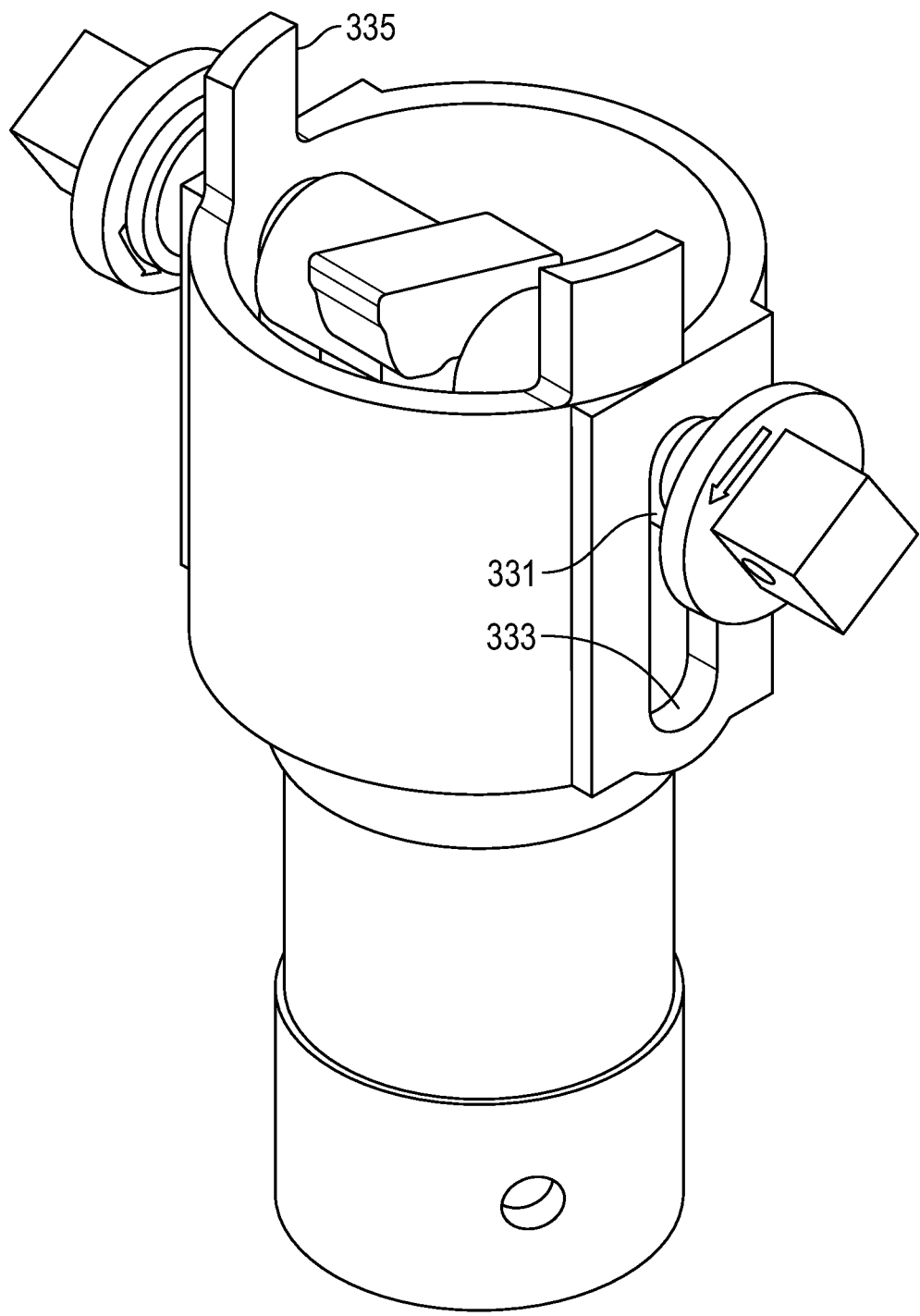
Figure 3F:
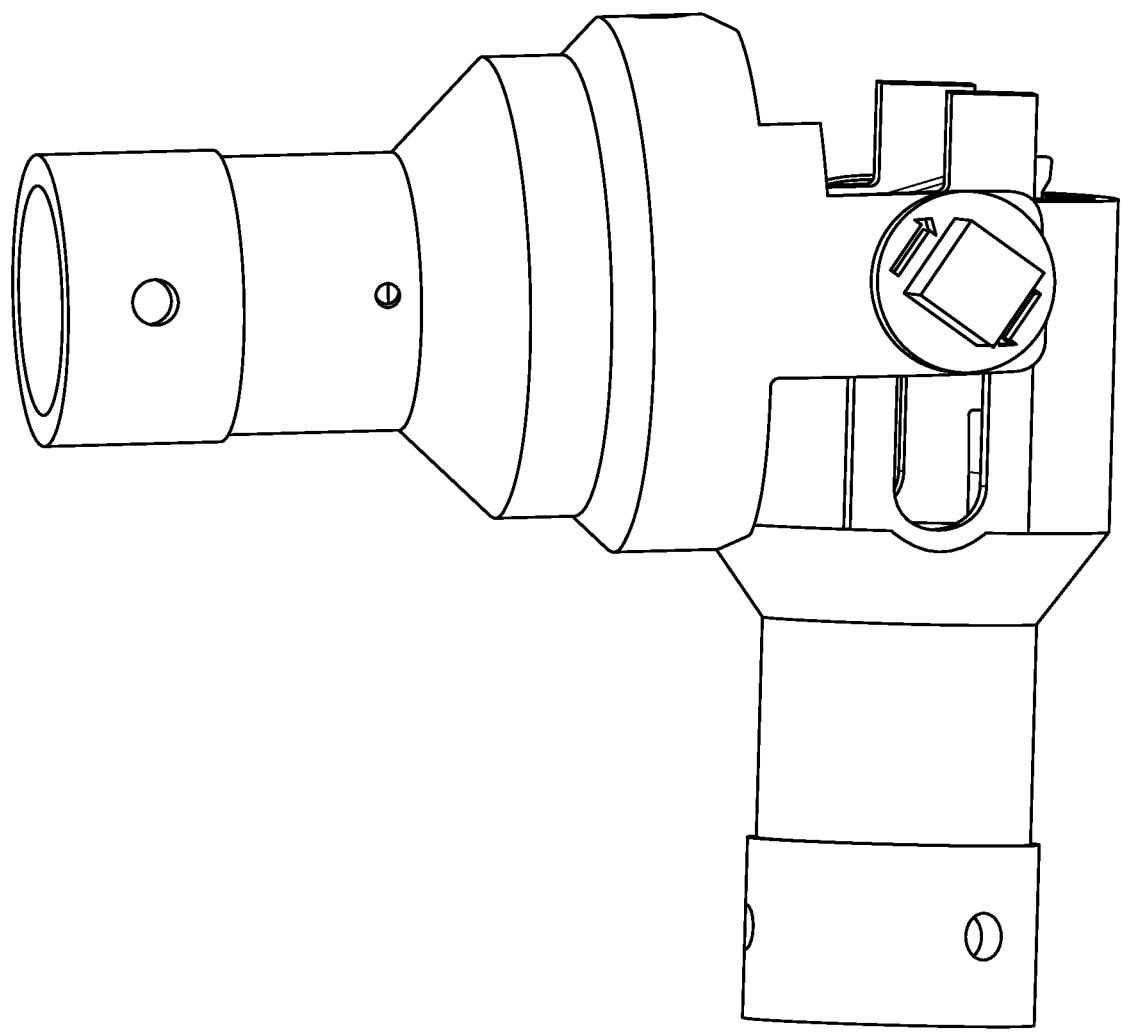

FIG. 3D illustrates a securing assembly configured to selectively release the cup from the base. The tubular body 338 of the base 306 includes a fulcrum protrusion 334 on an inner surface 336 of the tubular body. The securing assembly 304 includes a rotatable shaft 330. The shaft 330 may be rotated from outside of the hinge joint by turning a bolt head 340 coupled to the shaft. The shaft may be rotatably mounted transversely through a diameter of the receiving end of the cup. The first tubular body, the second tubular body, and the securing assembly are configured to allow relative axial movement between the cup and the base by traversal of the slot 309 by the shaft 330.

The shaft 330 translates along the longitudinal slot 309 between at least a lower relative position (333) corresponding to an engaged state in which the insertion end of the base is received by the receiving end of the cup, and an upper relative position (331) corresponding to a released state in which the insertion end of the base is free of the receiving end of the cup. In the engaged state, the shaft rests in the lower relative position (333). The force of gravity on the cup and the coupled upper support may urge the shaft to this position, and base 306 supports substantially all the weight of the cup 302 and the attached upper tubular body (e.g., the upper support). The shaft 330 has a cam projection 332 positioned to contact against the fulcrum protrusion 334 and displace the shaft 330 toward the upper relative position 331 when the shaft is rotated.

In operation, turning the shaft 330 provides sufficient steady force to eject the cup 302 from the engaged state. The inner diameter of the tubular body incorporated in the cup is approximately the same but slightly larger than the outer diameter of the tubular body incorporated in the base 306. The tubular body of the cup thus acts as a co-axial axially sliding sleeve with respect to the base until released. A non-axial movement constraint embodied, for example, in the outer diameter of the tubular body incorporated in the base, when paired with the urging of the cam projection against the fulcrum provides a distinct mechanical advantage. In other embodiments, longitudinal guides may be employed alternatively or in addition to this sliding sleeve arrangement.

The fulcrum protrusion 334 comprises a cam rest 342 (e.g., a notch) configured to receive the cam projection 332. Upon rotation of the shaft sufficient to displace the shaft a predetermined distance, a catch 344 on the cam projection 332 engages the rest 342 in the released state to lock the securing assembly, whereby the cam rest prevents movement of the rotatable shaft toward the adaptor end of the base.

The cup 302 is configured to rotate about the shaft 330 while the shaft is in the upper relative position to lower the adaptor end of the cup corresponding to an open condition of the hinge. In other embodiments, the fulcrum protrusion 334 may be designed to receive the specially shaped cam head using other designs or mechanisms. Thus, when sufficiently rotated the cam projection 332 and fulcrum protrusion 334 are engaged in a stop which does not allow the shaft to rotate backwards or forwards and keeps the joint in an open position. This allows a technician to use both hands to safely lower the top portion of the pole. The shaft may incorporate multiple protrusions, or a ratchet gear which may engage a pawl. The longitudinal slot 309 may be configured to allow translating the shaft above the upper relative position to disengage the catch from the cam rest. The insertion end of the base comprises one or more stops 335 configured to encounter the cup to constrain rotation of the cup past a critical point. That is, the cup may be constrained to rotate down only in a single direction, away from the stops ('forward'). The angle of possible rotation may thus be limited to predetermined angle range (e.g., less than 180 degrees, less than 120 degrees, less than 90 degrees, etc.).

Figure 4A:
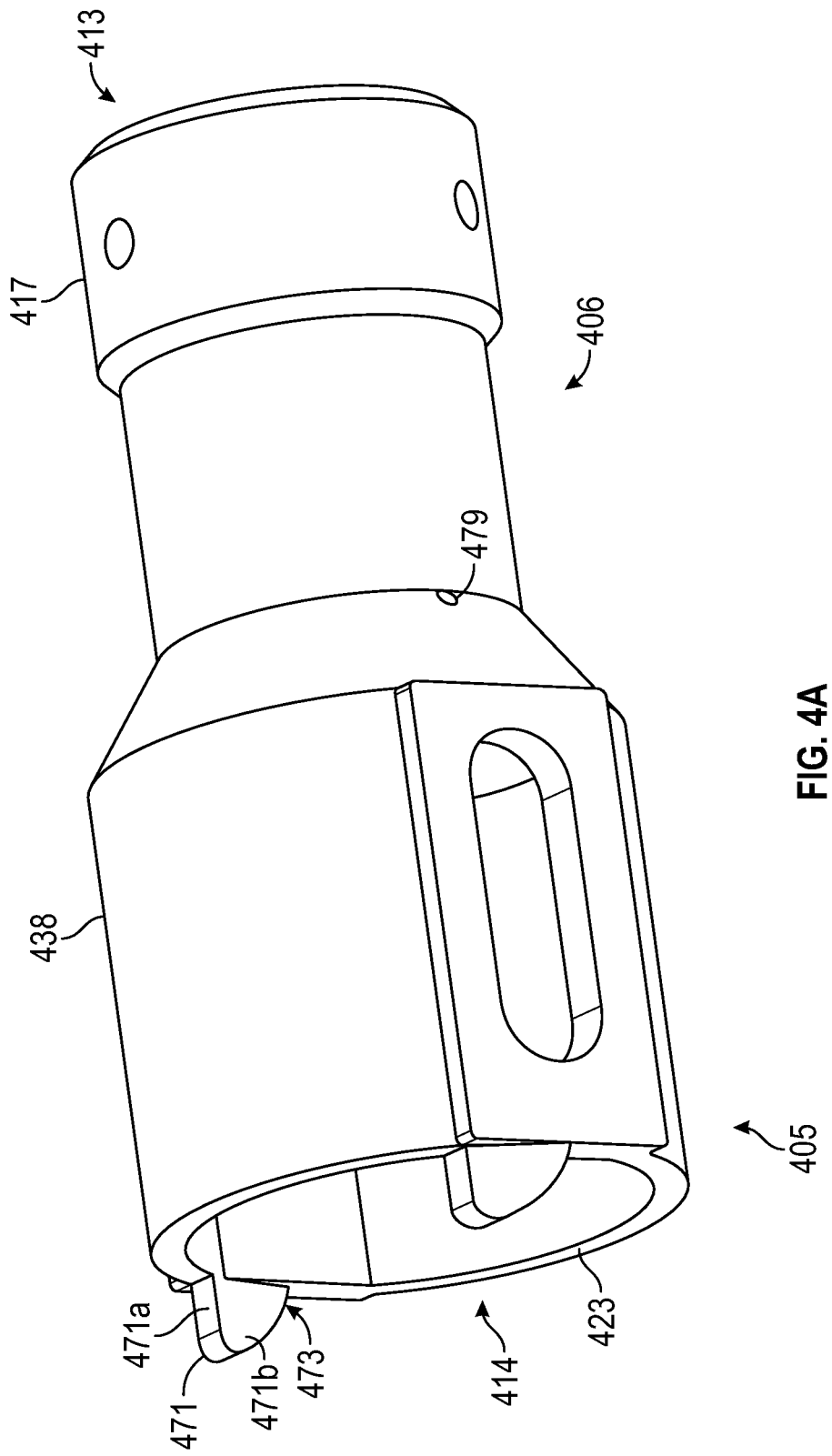
FIGS. 4A-4G illustrate hinge joint components in accordance with embodiments of the present disclosure.
Figure 4B:
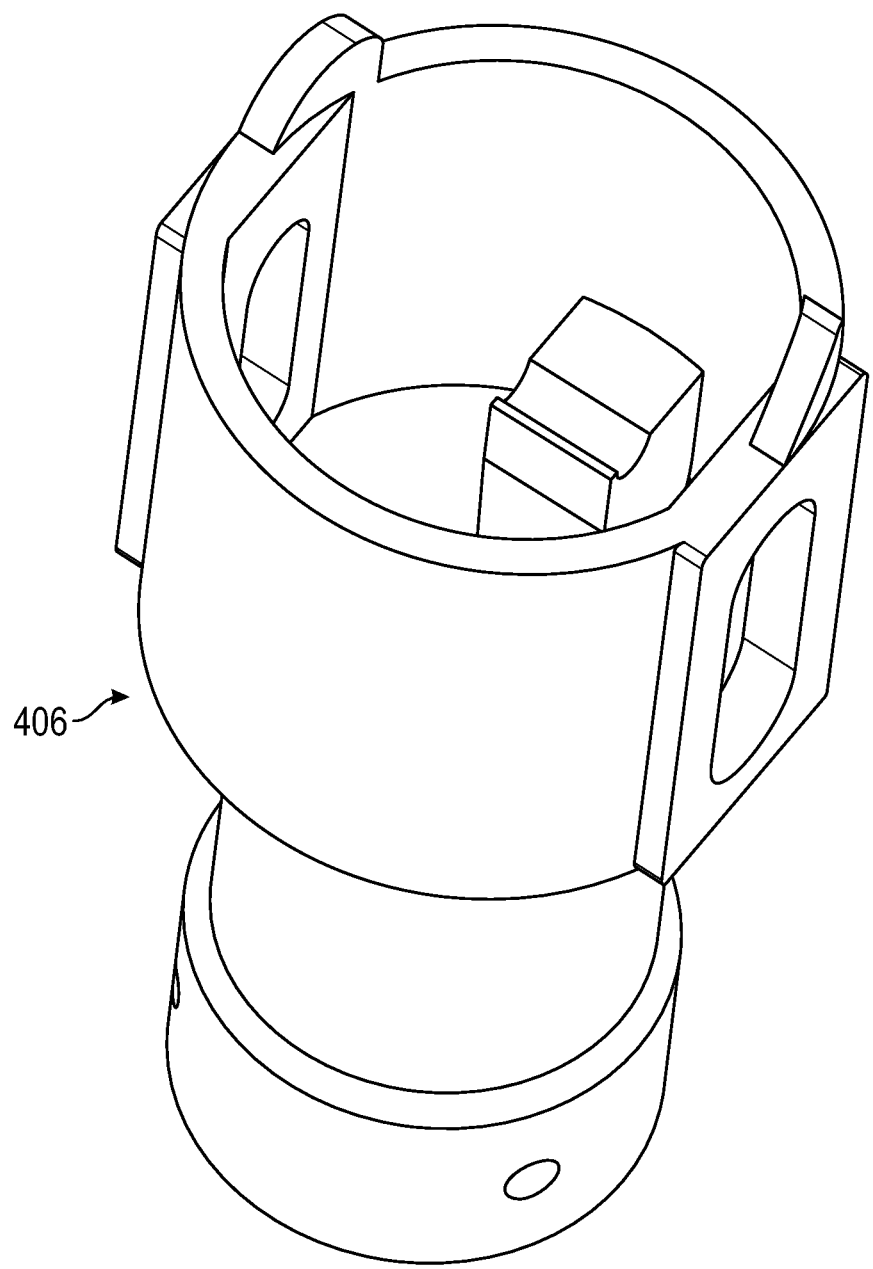
Figure 4C:
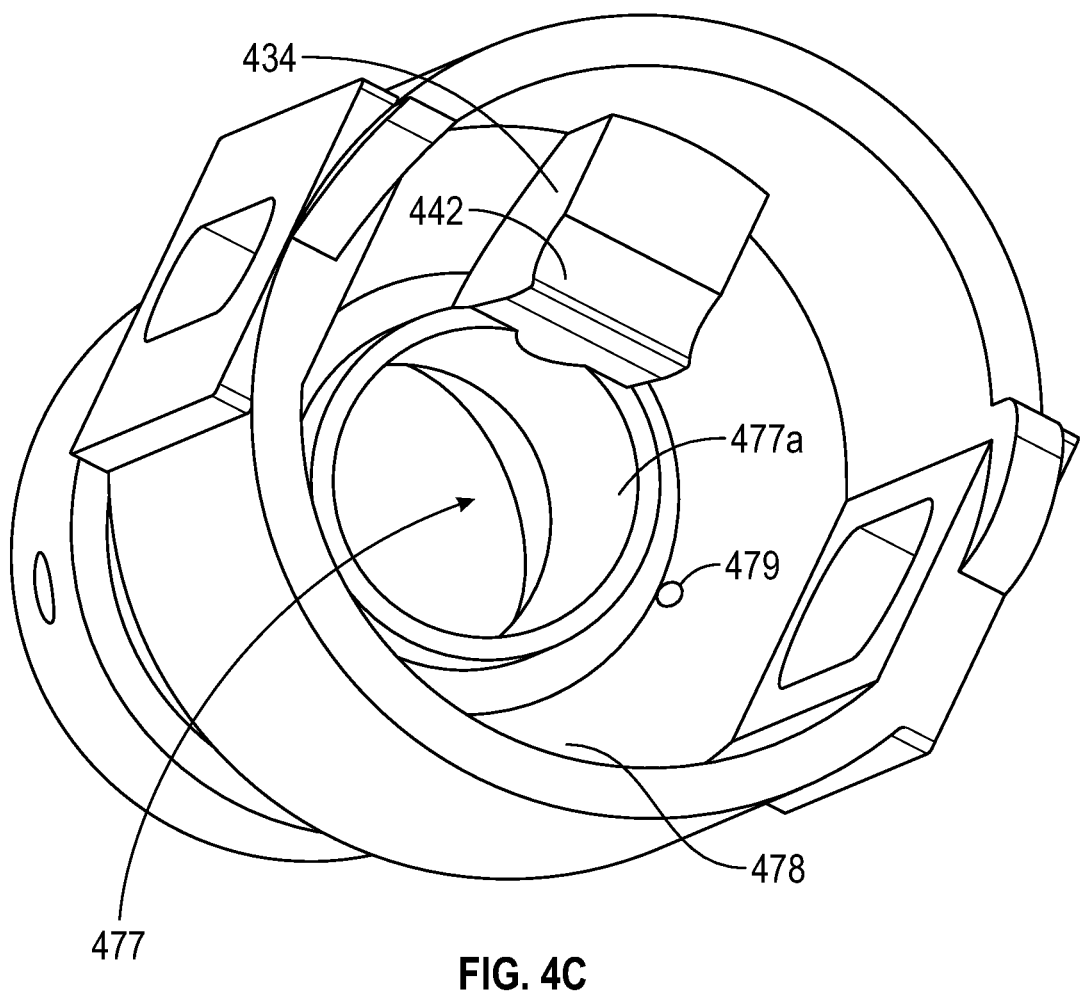

FIGS. 4A-4G illustrate hinge joint components in accordance with embodiments of the present disclosure. FIGS. 4A-4C illustrate a base in accordance with embodiments of the present disclosure. Base 406 comprises a tubular body 438 having an opening 414 at an insertion end 405 and a passage extending through the body 438. Base 406 also has a coupling 417 at the end opposite the insertion end 405. The coupling 417 features an open end 413 in communication with the passage.

The insertion end has a lip 423 from which one or more stops 471 project. One or more of the stops may feature at least one constraining surface 471a and at least one non-constraining surface 471b. The stops may be tabs or teeth-like members having an arcuate surface, such as arcuate edge 473. Arcuate edge 473 is substantially non-parallel with a longitudinal axis of the tubular body 438. FIG. 4G illustrates a cup in accordance with embodiments of the present disclosure. Cup 402 includes stops 499 which cooperate with stops 471 to prevent movement (e.g., rotation about the shaft) of the cup in the direction away from the stop. In operation, the stop may constrain rotational motion of the cop in a first direction, but allow rotational motion in the opposite direction. Arcuate edge 473 facilitates a trailing portion of the cup 402 (FIG. 4G) to slidingly traverse the stop 471. In other embodiments, cup 402 may feature a lip without stops.

A fulcrum protrusion 434 projects from an inner surface of the tubular body 438. The fulcrum protrusion 434 has a rest 442, which functions as described above when base 406 and cup 402 are hingedly connected by shaft 430. Base 406 also includes a channel 477 maintaining communication between the open end 413 of coupling 417 and the opening 414 at the insertion end 405, the channel is at least partially defined by a pipe 477a extending from a lower end of the base interior to isolate an inner surface 478 of the tubular body from the open end 413 of coupling 417 with respect to resting fluid under the influence of gravity. Weep hole 479 allows collected fluid to drain from the interior of the tubular body.

Figure 4D:
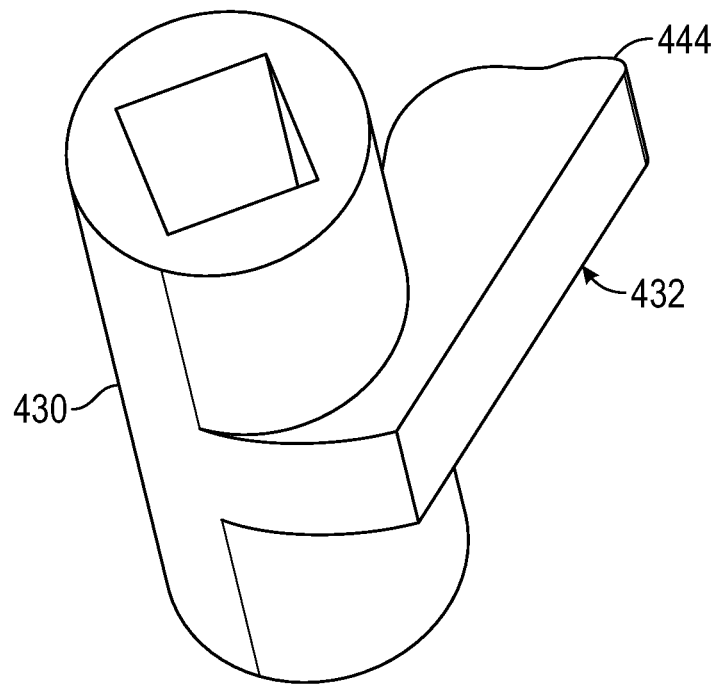
Figure 4E:
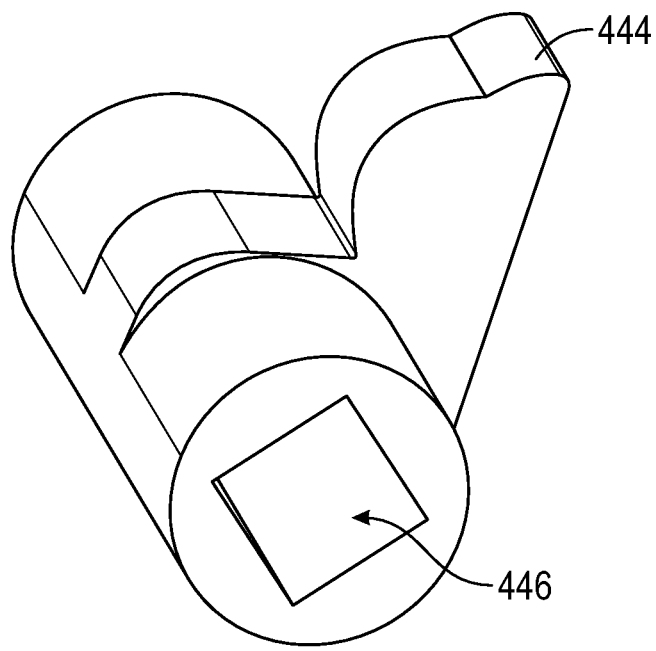
Figure 4F:
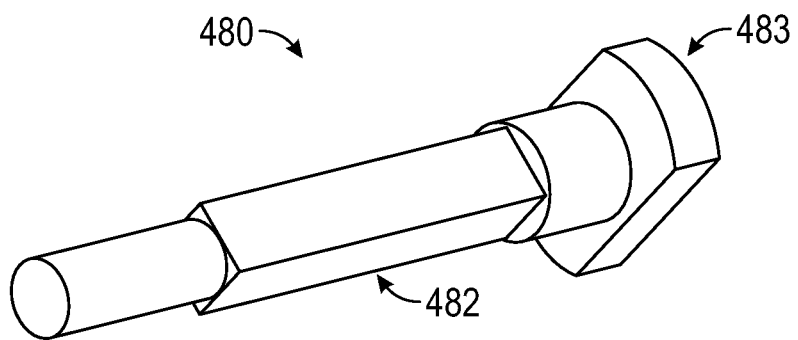
Figure 4G:
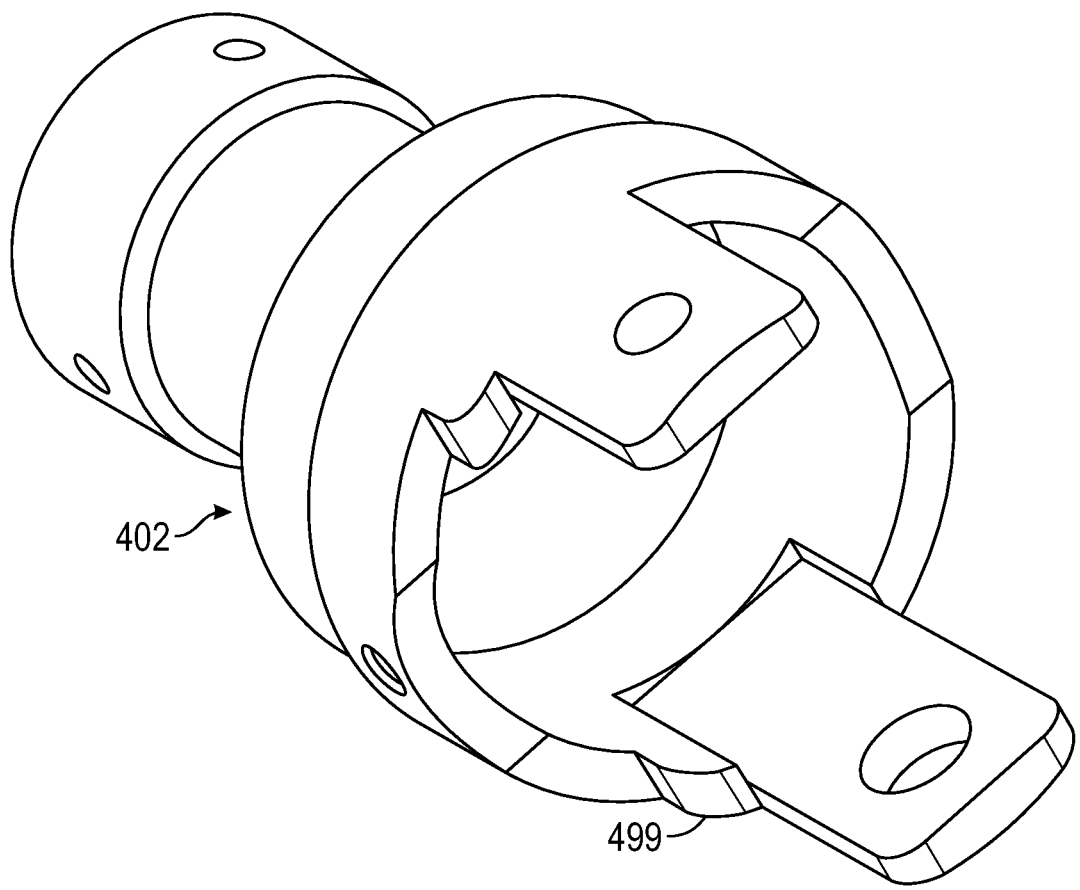

FIGS. 4D-4F illustrate securing assembly components in accordance with embodiments of the present disclosure. FIGS. 4D & 4E illustrate a shaft in accordance with embodiments of the present disclosure. The shaft 430 includes a cam projection 432 having a catch 444 at the distal end. The shaft defines a keyway 446. FIG. 4F illustrates a pin in accordance with embodiments of the present disclosure. Pin 480 may be inserted into keyway 446 when forming a locking assembly. Pin 480 includes a pinshaft 482 and head 483, comprising a knob or handle which facilitates rotation of the pin about its long axis by hand or wrench turning. The pinshaft 482 may comprises a square cross-section configured to fit the keyway 446.

In some cases, installation may include replacing previous pole installations. In such cases, it may be possible to use all or part of the previous pole in the construction of the pole support system. Hinge joints as described herein may be used to assemble a wired pivoting pole assembly, without the use of welding equipment or heavy tools, by coupling a lower pole section and an upper pole section. In particular examples of joints described herein, the tubular body may be adapted for wiring access.

Figure 5:
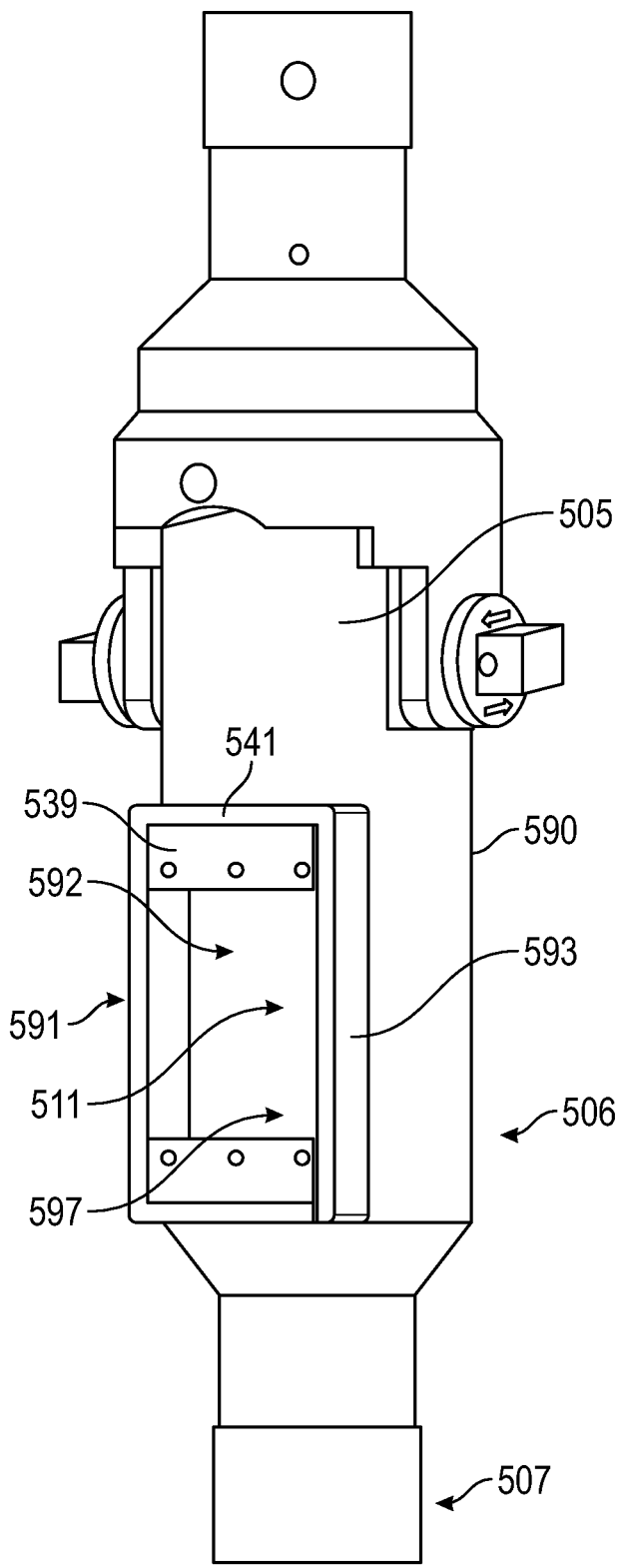
FIG. 5 illustrates a hinge joint enabling wiring access in accordance with embodiments of the present disclosure.

FIG. 5 illustrates a hinge joint enabling wiring access in accordance with embodiments of the present disclosure. Hinge joint 500 includes a base 506 comprising a tubular body 590. Wiring access is provided by an oriel 591 comprising a plurality of walls 593 protruding from the tubular body 590. The plurality of walls 593 and the tubular body 590 cooperate to define a wiring chamber 592 in communication with a passage 511 formed by the interior of the base extending between the insertion end 505 and the adaptor end 507. The oriel 591 defines an opening 597 allowing lateral entry to the wiring chamber, and which may be sealed by a hatch cover when wiring operations are concluded. Hatch mounting flanges 539 adjacent the opening may be included for this purpose. In embodiments, wiring chamber 592 may be offset from the tubular body and opening 597 may be configured with dimensions sufficient for comfortable entry of a standard sized human hand. Rim flange 541 surrounds the opening and the hatch mounting flanges 539 for the sealing engagement of the hatch cover. The dimensions and other specifications of the wiring chamber and oriel may conform to a standard Ferris box (e.g., an FS or FD junction box).

Installation of hinges in accordance with aspects of the present disclosure (e.g., hinge joint 500) may be completed prior to completion of wiring the assembly. That is, wiring may be run before fastening the pole section in the coupling. Equipment may also be fastened to the top end of the pole section. Installation of the pole support system may be carried out completely, followed by the connection of wiring to electrical or data lines from the pole support system to a main trunk or the like.

More or fewer flanges may be used, and flanges may be oriented interior or exterior to the In other embodiments, hatch cover may be sealed by threaded engagement of bolts or screws through the hatch cover to tabs spaced around the perimeter of the opening, or to internal or external flanges. Other fasteners, such as locking clips, locking clamps, and so may also be employed, as suitable.

In some embodiments, instead of using an adaptor end on the joint to accommodate the pole segments, the pole support system includes a joint secured to the respective pole sections using a welded connection or the like.

Figure 6:
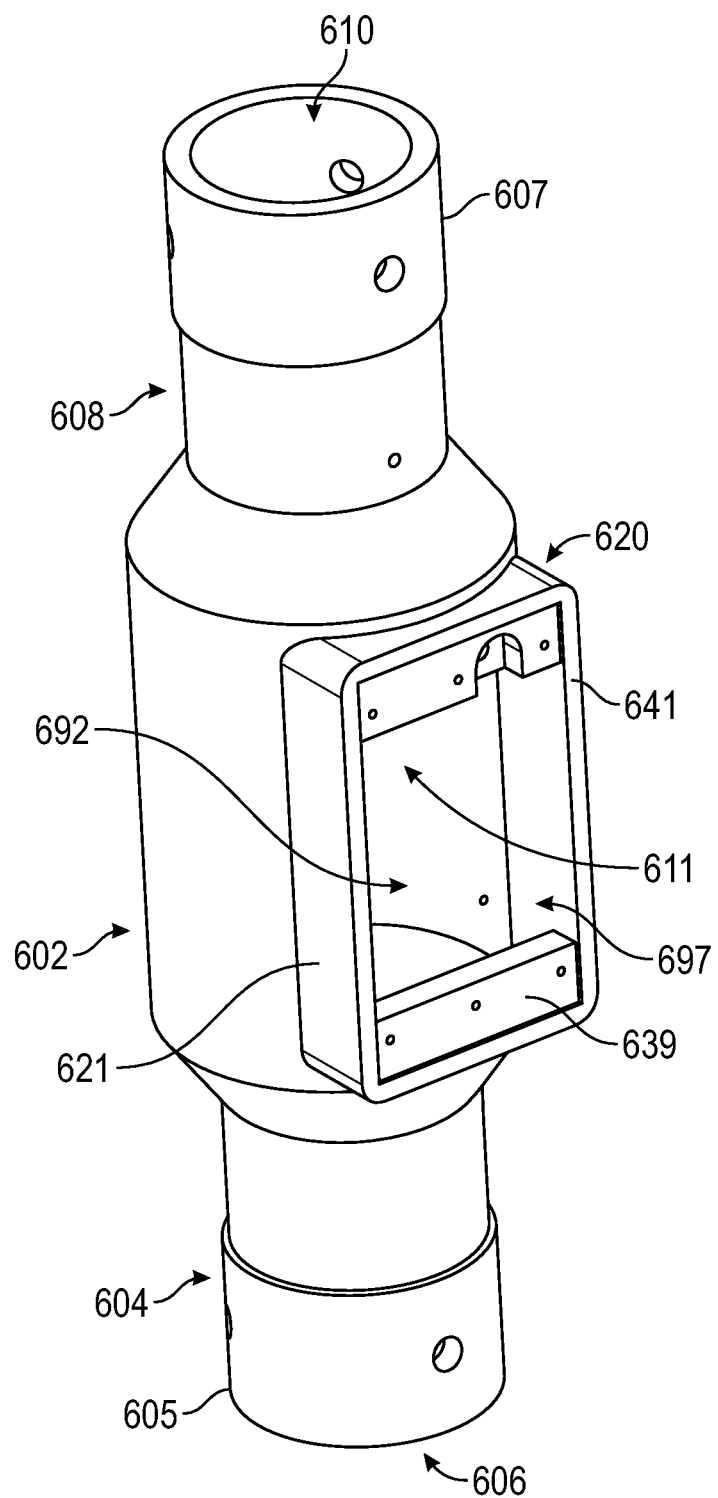
FIG. 6 illustrates a non-lowering joint configured to enable wiring access in accordance with embodiments of the present disclosure.

FIG. 6 illustrates a non-lowering joint configured to enable wiring access in accordance with embodiments of the present disclosure. Pole joint 600 includes many of the features of hinge joint 500, including those which facilitate pole wiring. However, pole joint 600 will not allow for lowering of the upper support without some disassembly of the pole support system.

Pole joint 600 comprises a tubular body 602 including a lower adaptor end 604 comprising a lower coupling 605 defining a first port 606 configured to receive a first pole section of the plurality of pole sections. Pole joint 600 also includes an upper adaptor end 608 opposite the lower adaptor end 604. The upper adaptor end 608 comprises an upper coupling 607 defining a second port 610 configured to receive a second pole section of the plurality of pole sections. Pole joint 600 includes a passage 611 between the first port and the second port allowing wiring to pass through the tubular body. The passage may comprise an interior of the tubular body. Pole joint 600 also includes an oriel 620 comprising a plurality of walls 621 protruding from the tubular body 602. Upon installation of the pole joint onto a typical lower support (pole) in place, the pole joint may be configured to be located at chest height. The plurality of walls and the tubular body cooperate to define a wiring chamber in communication with passage 611. The oriel defines an opening 697 allowing lateral entry to the wiring chamber (i.e., substantially transverse to a longitudinal axis of the component substantially parallel with the gravitational force of the earth), and which may be sealed by a hatch cover when wiring operations are concluded. Hatch mounting flanges 639 adjacent the opening may be included for this purpose. In embodiments, wiring chamber 692 may be offset from the tubular body and opening 697 may be configured with dimensions sufficient for comfortable entry of a standard sized human hand. Rim flange 641 surrounds the opening and the hatch mounting flanges 639 for the sealing engagement of the hatch cover. The dimensions and other specifications of the wiring chamber and oriel may conform to a standard Ferris box (e.g., an FS or FD junction box). The pole joint 600 is configured, upon installation of the joint to form the pole support system, to transfer loading between the first pole section and the second pole section via transmission of the load through the tubular body 602. As it is for the joints described above, the gravity induced load on the upper pole section biases the joint into the lower pole section and the upper pole section into the joint with a load along a longitudinal axis of each of the lower pole section, the upper pole section, and the hinge; this results in a more secure coupling.

The lower adaptor end may comprise a pipe seat at least partially defining a channel maintaining communication between the first port and an interior of the tubular body. The channel is also at least partially defined by a pipe extending from a lower end of the base interior (an end of the interior closer to the lower adaptor end) to isolate an inner surface of the tubular body from the open end of the coupling on the base with respect to resting fluid under the influence of gravity. The pipe may extend upward from an end of the interior closer to the lower adaptor end to isolate an inner surface of the tubular body from the channel with respect to resting fluid within the interior under the influence of gravity, as in channel 477 of FIG. 4C. The upper adaptor end may comprise a pipe seat defining a channel maintaining communication between the second port and an interior of the tubular body. The upper adaptor end may be configured to at least partially receive the second pole section in an annular space between the upper coupling and the pipe seat. Either pipe seat may comprise a fluid-tight tubular.

While the foregoing disclosure is directed to the one mode embodiments of the disclosure, various modifications will be apparent to those skilled in the art. It is intended that all variations be embraced by the foregoing disclosure.

What is claimed is:

1. An apparatus for use in a pole support system comprising a plurality of pole sections, the apparatus comprising:
   a hinge joint comprising:
   a base having an insertion end and an adaptor end opposite the insertion end, the base having a longitudinal slot at the insertion end and comprising a tubular body with a fulcrum protrusion on an inner surface of the tubular body;
   a cup having a receiving end selectively receiving the insertion end of the base and an adaptor end opposite the receiving end;
   a securing assembly configured to selectively release the cup from the base, the securing assembly comprising a rotatable shaft that translates along the longitudinal slot between at least i) a lower relative position corresponding to an engaged state in which the insertion end of the base is received by the receiving end of the cup, and ii) an upper relative position corresponding to a released state in which the insertion end of the base is free of the receiving end of the cup;
   the shaft having a cam projection positioned to contact against the fulcrum protrusion and displace the shaft toward the upper relative position when the shaft is rotated.

2. The apparatus of claim 1 wherein the fulcrum protrusion comprises a cam rest configured to receive the cam projection and wherein, upon rotation of the shaft sufficient to displace the shaft a predetermined distance, a catch on the cam projection engages the cam rest in the released state to lock the securing assembly, whereby the cam rest prevents movement of the rotatable shaft toward the adaptor end of the base.

3. The apparatus of claim 1 comprising a bolt head disposed on the shaft exterior to the hinge joint, wherein the shaft is configured for rotation responsive to rotation of the bolt head.

4. The apparatus of claim 1 wherein the cup is configured to rotate about the shaft while the shaft is in the upper relative position to lower the adaptor end of the cup corresponding to an open state of the hinge joint.

5. The apparatus of claim 4 wherein the cup is configured to rotate between a first angle corresponding to the engaged state and a second angle corresponding to an open state of the hinge joint.

6. The apparatus of claim 1 wherein the insertion end of the base includes at least one stop configured to constrain rotation of the cup past a critical point.

7. The apparatus of claim 2 wherein the longitudinal slot is configured to allow translating the shaft above the upper relative position to disengage the catch from the cam rest.

8. A pole support system comprising:
   at least one first pole section and at least one second pole section; and
   a hinge joint including:
   a base having an insertion end and an adaptor end opposite the insertion end, the insertion end having a longitudinal slot and a fulcrum protrusion on an inner surface of the base;
   a cup having a receiving end selectively receiving the insertion end of the base and an adaptor end opposite the receiving end;
   a securing assembly configured to selectively release the cup from the base, the securing assembly including a shaft configured to move along the longitudinal slot between at least i) a lower position corresponding to an engaged state in which the insertion end of the base is received by the receiving end of the cup, and ii) an upper position corresponding to a released state in which the insertion end of the base is free of the receiving end of the cup, the shaft having a cam projection positioned to contact the fulcrum protrusion and move the shaft toward the upper position when the shaft is rotated; and
   an oriel including a plurality of walls integral with the base, the plurality of walls and the base cooperating to define a wiring chamber, the oriel having an opening allowing lateral entry to the wiring chamber.

9. The pole support system of claim 8, wherein the fulcrum protrusion comprises a cam rest configured to receive the cam projection, and wherein upon rotation of the shaft sufficient to move the shaft along the longitudinal slot a predetermined distance, a catch on the cam projection engages the cam rest in the released state to lock the securing assembly and prevents movement of the rotatable shaft toward the adaptor end of the base.

10. The pole support system of claim 8, wherein the shaft includes a bolt head that is exterior to the hinge joint, and wherein the shaft is configured for rotation in response to rotation of the bolt head.

11. The pole support system of claim 8, wherein the cup is configured to rotate about the shaft while the shaft is in the upper position to lower the adaptor end of the cup corresponding to an open condition of the hinge joint.

12. The pole support system of claim 11, wherein the cup is configured to rotate between a first angle corresponding to the engaged state and a second angle corresponding to an open state of the hinge joint.

13. The pole support system of claim 8, wherein the insertion end of the base includes at least one stop configured to constrain rotation of the cup past a critical point.

14. The apparatus of claim 8, wherein the longitudinal slot is configured to allow translating the shaft above the upper position to disengage the catch from the cam rest.

\* \* \* \* \*